United States Patent [19]
Shindo et al.

[11] 3,869,477
[45] Mar. 4, 1975

[54] TOCOPHERYL-P-CHLOROPHENOXYISOBUTYRIC ACID ESTER

[75] Inventors: Hideyasu Shindo, Tokyo; Toshio Kumagai, Kawagoe; Kengo Dot, Miyoshi, all of Japan

[73] Assignee: Kowa Yakuhin Kogyo Kabushiki Kaisha, Tokyo-to, Japan

[22] Filed: Jan. 30, 1973

[21] Appl. No.: 328,021

[30] Foreign Application Priority Data
Feb. 4, 1972 Japan.............................. 47-12672

[52] U.S. Cl............................. 260/345.5, 424/284
[51] Int. Cl............................................... C07d 7/22

[58] Field of Search................................. 260/345.5

[56] References Cited
UNITED STATES PATENTS
3,026,330   3/1962   Folkers et al................... 260/345.5

*Primary Examiner*—John M. Ford
*Attorney, Agent, or Firm*—Scrivener Parker Scrivener & Clarke

[57] ABSTRACT

The present invention relates to such a tocopheryl-p-chlorophenoxyisobutyric acid ester as has functions of preventing and curing arterial sclerosis, also of effectuating betterment of lipid metabolism such as de-cholesterol and a process of manufacture thereof.

1 Claim, No Drawings

TOCOPHERYL-P-CHLOROPHENOXYISOBUTYRIC ACID ESTER

The present invention relates to a process of manufacture of such a tocopheryl-p-chlorophenoxyisobutyric acid ester of a novel classification as has a superb function of antiarterial sclerosis.

Generally, a p-chlorophenoxyisobutyric acid ester is employed as a medicine for hyperlipoidemia, an arteriosclerotic disease, gruel-like arteriosclerosis, infarction of the myocardium, and the like resulting from hyperlipoidemia, due to such efficacy thereof that removes cholesterol, triglyceride and phosphatide contained in the blood, reduces the viscosity force of blood plasma, and removes cholesterol in case coagulation of the blood is exasperated as well, until it is recognized to display superb efficacy. For all that, ethyl-p-chlorophenoxyisobutyric acid ester that has come to be frequently employed recently still has such a defect that it is anything but recommendable for continual use for a long period since it produces such ill effects as gastroenteric troubles, including sickness at the stomach and diarrhoea, as well as liver trouble.

Meanwhile, tocopherol has a powerful vasodilating function, a powerful antiarterial sclerotic function and a powerful liver protective function, as well as the functions of vitamin E.

Having an eye to this point, these inventors discovered that an ester obtained by having tocopherol and p-chlorophenoxyisobutyric acid react on each other had such superb functions that prevent and cure arterial sclerosis, also effectuate the betterment of lipid metabolism such as decholesterol, virtually free from harmful after-effects, and confirmed through experiments on animals that the said ester proved far better in terms of these purposes than the case of medicating tocopherol and p-chlorophenoxyisobutyric acid ethylester mixed with each other.

The present invention is what was completed from these viewpoints, and relates to a process of manufacture of a novel compound of tocopheryl-p-chlorophenoxyisobutyric acid ester by the combination of tocopherol with p-chlorophenoxyisobutyric acid by the employment of such a generally known esterification operation as an acid chloride process or an acid anhydride process.

The tocopherol employed in the above-mentioned process is α-tocopherol of the formula

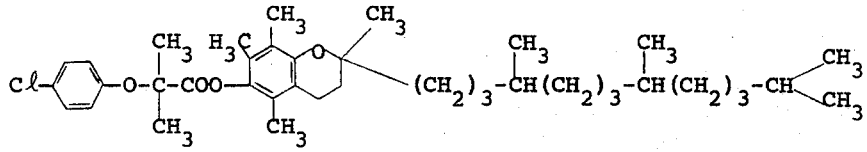

β-, γ- and δ-tocopherols.

The tocopheryl-p-chlorophenoxyisobutyric acid ester of a novel property obtainable by the application of the process introduced in the present invention displays its superb features in the prevention and the cure of arterial sclerosis, has the function of decholesterol, and produces multifarious effects that harmful after-effects are virtually only negligible.

The present invention will be further elucidated below in a concrete manner by way of the following examples:

EXAMPLE 1.

20ml of benzene is added to 10.8g of p-chlorophenoxyisobutyric acid, 18g of thionyl chloride is dropped therein, and surplus thionyl chloride is removed by the application of distillation under reduced pressure in the wake of heating and return current for 15 minutes. A solution of 10g of dl-α-tocopherol in a mixed liquid of 20ml of benzene and of 4ml of pyridine is added thereto by dropping, while cooling, it is filtered after agitation for 3 hours in the room temperature, the filtrate is concentrated in the current of nitrogen, an unsolved part is removed by adding 100ml of benzen, the benzen layer is washed with n—HCL, n—NaHCO₃ and water, then it is dehydrated by anhydrous sodium sulfate, thereafter concentrated under reduced pressure, now an orange-brown-colored oily matter is obtained. By refining it through column chromatography, 9.0g of yellow transparent oily dl-α-tocopheryl-p-chlorophenoxyisobutyric acid ester was obtained (62% in yield).

$d_4^{20}$ 1.036

λ: 270mμ and 365mμ (alcohol solution) max.

The elementary analysis value to be $C_{39}H_{59}O_4Cl$,
  Calculated value (%) C: 74.67, H: 9.48, Cl: 5.65
  Measured value (%) C: 74.75, H: 9.81, Cl: 5.75

EXAMPLE 2.

20.7g of anhydride p-chlorophenoxyisobutyric acid and 10g of dl-α-tocopherol are agitated in 50ml of pyridine at 90°C for 4 hours. Upon completion of reaction, the mixture is filtered, the filtrate is concentrated under reduced pressure in the current of nitrogen, 100ml of benzene is added thereto, and unsolved part is removed, and the benzene layer is washed with n—HCL, n—NaHCO₃ and water, then dehydrated by anhydrous sodium sulfate, followed by concentration under reduced pressure, now an orange-brown-colored oily matter is obtained. By refining it through column chromatography, 9.5g of yellow oily dl-α-tocopheryl-p-chlorophenoxyisobutyric acid ester was obtained (65% in yield).

$d_4^{20}$ 1.045

λ: Max. 270mμ and 365mμ (alcohol solution)

The elementary analysis value to be $C_{39}H_{59}O_4Cl$,
  Calculated value (%) C: 74.67, H: 9.48, Cl: 5.65
  Measured value (%) C: 74.73, H: 9.75, Cl: 5.77

What we claim is:

1. α-tocopheryl p-chlorophenoxyisobutyrate of the formula

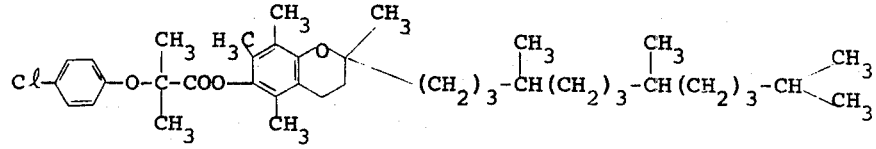

* * * * *

UNITED STATES PATENT OFFICE
CERTIFICATE OF CORRECTION

Patent No. 3,869,477             Dated March 4, 1975

Inventor(s) Hideyasu SHINDO et al.

It is certified that error appears in the above-identified patent and that said Letters Patent are hereby corrected as shown below:

The formula appearing between lines 47 and 54 of column 1 should read:

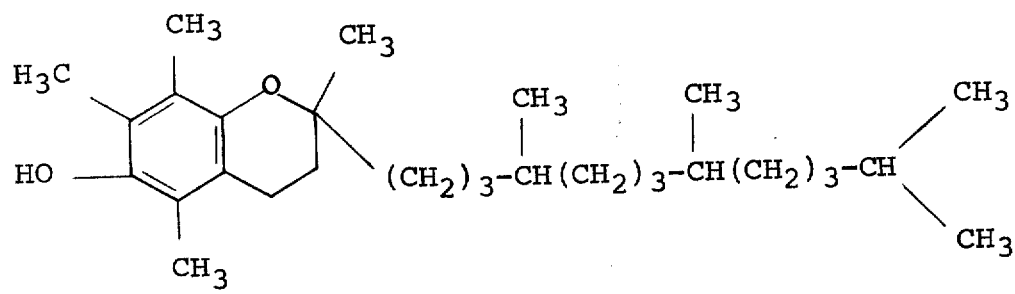

Line 55 of column 1 under the formula should be deleted.

Signed and Sealed this

Tenth Day of August 1976

[SEAL]

Attest:

RUTH C. MASON
Attesting Officer

C. MARSHALL DANN
Commissioner of Patents and Trademarks